US010032107B2

(12) United States Patent
Burghardt et al.

(10) Patent No.: US 10,032,107 B2
(45) Date of Patent: Jul. 24, 2018

(54) LIGHT-EMITTING DIODE ARRANGEMENT AND DRIVER ARRANGEMENT FOR AN ELECTRONIC DEVICE

(71) Applicant: NXP B.V., Eindhoven (NL)

(72) Inventors: Arne Burghardt, Hamburg (DE); Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 1 day.

(21) Appl. No.: 15/179,929

(22) Filed: Jun. 10, 2016

(65) Prior Publication Data

US 2016/0364639 A1 Dec. 15, 2016

(30) Foreign Application Priority Data

Jun. 12, 2015 (EP) .................................... 15171818

(51) Int. Cl.
*H05B 33/08* (2006.01)
*G06K 19/077* (2006.01)

(52) U.S. Cl.
CPC . *G06K 19/07732* (2013.01); *G06K 19/07705* (2013.01); *G06K 19/07743* (2013.01); *G06K 19/07749* (2013.01); *H05B 33/083* (2013.01); *H05B 33/089* (2013.01); *H05B 33/0827* (2013.01); *H05B 33/0845* (2013.01)

(58) Field of Classification Search
CPC ......... G06K 7/10584; G06K 19/07705; H05B 33/0806; H05B 33/0827; G09G 3/3413; G09G 3/342
USPC .............................. 235/492; 250/205, 214 D
See application file for complete search history.

(56) References Cited

U.S. PATENT DOCUMENTS 4,298,869 A * 11/1981 Okuno ..................... G08B 5/36 257/88
5,633,651 A 5/1997 Carvajal et al.
9,053,398 B1 * 6/2015 Cloutier ........... G06K 19/06206
2002/0149892 A1 * 10/2002 Williams ............... H02H 9/025 361/58

(Continued)

FOREIGN PATENT DOCUMENTS

DE 102 39 630 A1 3/2004
DE 10 2009 054 535 A1 2/2011

(Continued)

OTHER PUBLICATIONS

Machine translation of JP 54-034822 from Japanese Patent Office, retrieved on Apr. 29, 2017, https://www4.j-platpat.inpit.go.jp/eng/tokujitsu/tkbs_en/TKBS_EN_GM401_Detailed.action.*

(Continued)

*Primary Examiner* — Suezu Ellis

(57) ABSTRACT

According to a first aspect of the present disclosure, an electronic device is provided, which comprises a light-emitting diode arrangement and a driver arrangement operatively connected to the light-emitting diode arrangement, wherein at least one light-emitting diode of the light-emitting diode arrangement is operatively connected between a first driver of the driver arrangement and a second driver of said driver arrangement, such that, in operation, the light-emitting diode may be energized with current flowing between the first driver and the second driver. Furthermore, according to a second aspect of the present disclosure, a corresponding method of manufacturing an electronic device is conceived.

17 Claims, 5 Drawing Sheets

(56) References Cited

U.S. PATENT DOCUMENTS

| | | | | |
|---|---|---|---|---|
| 2005/0243022 | A1* | 11/2005 | Negru ................ | H05B 33/0857 345/46 |
| 2008/0297644 | A1 | 12/2008 | Farchtchian et al. | |
| 2009/0050904 | A1 | 2/2009 | Hsieh et al. | |
| 2010/0109557 | A1* | 5/2010 | Bouchard .......... | H05B 33/0818 315/294 |
| 2010/0315019 | A1* | 12/2010 | Hoogzaad .......... | H05B 33/0818 315/291 |
| 2012/0120123 | A1 | 5/2012 | Adachi | |
| 2013/0049599 | A1 | 2/2013 | Logiudice | |
| 2014/0333219 | A1 | 11/2014 | Zijlstra et al. | |
| 2016/0092762 | A1* | 3/2016 | Dhayni .............. | G06K 19/0722 235/492 |

FOREIGN PATENT DOCUMENTS

| | | | |
|---|---|---|---|
| JP | 54034822 A | * | 3/1979 |
| WO | 2011/116404 A1 | | 9/2011 |

OTHER PUBLICATIONS

English equivalent translation of JP 54-0348522A, retrieved May 2017.*

Extended European Search Report for patent appln. No. 15171818.6 (dated Jan. 14, 2016).

* cited by examiner

LIGHT-EMITTING DIODE ARRANGEMENT AND DRIVER ARRANGEMENT FOR AN ELECTRONIC DEVICE

CROSS-REFERENCE TO RELATED APPLICATIONS

This application claims the priority under 35 U.S.C. § 119 of European patent application no. 15171818.6, filed on Jun. 12, 2015, the contents of which are incorporated by reference herein.

FIELD

The present disclosure relates to an electronic device. Furthermore, the present disclosure relates to a corresponding method of manufacturing an electronic device.

BACKGROUND

Today, electronic devices such as smart cards are widely used in society. For example, smart cards may be used as electronic identity (eID) cards or bank cards. Electronic devices of this kind may also be equipped with optical feedback indicators, for example light-emitting diodes. Since the electronic devices may be power-constrained, it may be desirable to control such light-emitting diodes efficiently, in particular in a power-efficient yet reliable way. This is particularly important for contactless smart cards, but also for other kinds of electronic devices, specifically for any device with an embedded microcontroller (MCU) and light-emitting diodes.

SUMMARY

According to a first aspect of the present disclosure, an electronic device is provided, which comprises a light-emitting diode arrangement and a driver arrangement operatively connected to the light-emitting diode arrangement, wherein at least one light-emitting diode of the light-emitting diode arrangement is operatively connected between a first driver of the driver arrangement and a second driver of said driver arrangement, such that, in operation, the light-emitting diode may be energized with current flowing between the first driver and the second driver.

In one or more embodiments, the first driver is configured to generate a voltage above a threshold voltage of the light-emitting diode.

In one or more embodiments, the second driver is configured to provide a ground potential or a voltage substantially below a threshold voltage of the light-emitting diode.

In one or more embodiments, the electronic device further comprises a processing unit which is configured to generate pulsed driver signals and to control the driver arrangement by supplying said pulsed driver signals to the driver arrangement.

In one or more embodiments, the light-emitting diode arrangement comprises two light-emitting diodes which are connected in antiparallel with each other, and wherein the driver arrangement is configured to energize the light-emitting diodes with current in alternating directions in dependence on the pulsed driver signals.

In one or more embodiments, the light-emitting diode arrangement comprises a plurality of light-emitting diodes which are connected in series, and wherein the driver arrangement is configured to energize each light-emitting diode separately with current in dependence on the pulsed driver signals.

In one or more embodiments, the processing unit is configured to generate the pulsed driver signals in dependence on a predefined luminance level for the light-emitting diode.

In one or more embodiments, the driver arrangement is coupled to a voltage limiter.

In one or more embodiments, the driver arrangement is configured to turn on the light-emitting diode with a frequency of at least 30 Hz.

In one or more embodiments, the electronic device is a low-power device.

In one or more embodiments, the electronic device is a smart card.

In one or more embodiments, the electronic device is a contactless smart card.

According to a second aspect of the present disclosure, a method of manufacturing an electronic device is conceived, which comprises providing the electronic device with a light-emitting diode arrangement and a driver arrangement operatively connected to the light-emitting diode arrangement, and connecting at least one light-emitting diode of the light-emitting diode arrangement between a first driver of the driver arrangement and a second driver of said driver arrangement, such that, in operation, the light-emitting diode may be energized with current flowing between the first driver and the second driver.

DESCRIPTION OF DRAWINGS

Embodiments will be described in more detail with reference to the appended drawings, in which.

DESCRIPTION OF EMBODIMENTS

Figure 1:
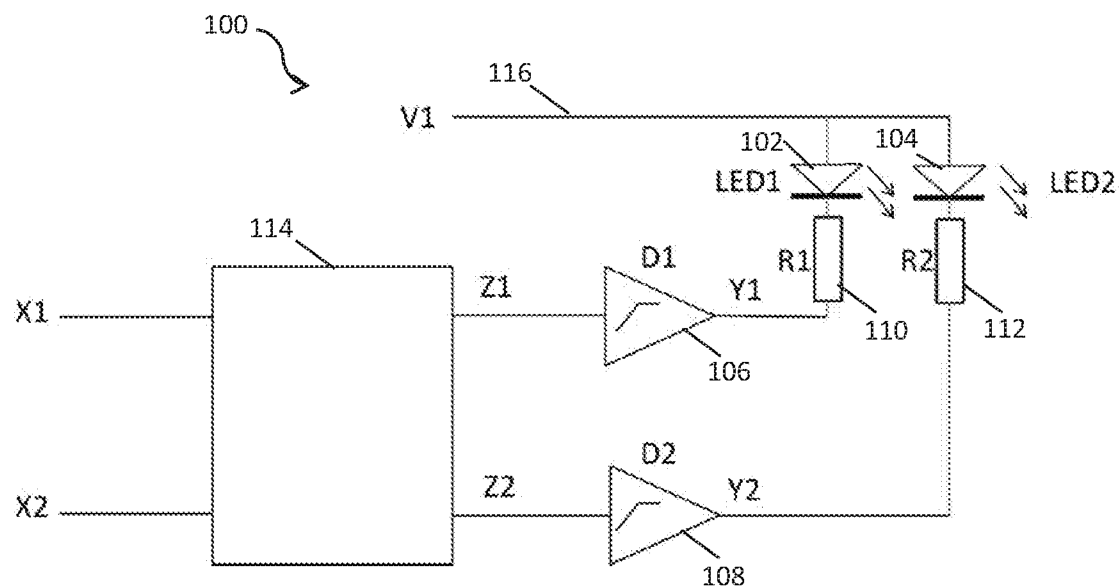
FIG. 1 shows an example of an electronic device.

FIG. 1 shows an example of an electronic device 100. The electronic device 100 comprises light-emitting diodes (LEDs) 102, 104 which are connected to a voltage source 116 at one end, and to respective drivers 106, 108 at another end. Furthermore, current-limiting resistors 110, 112 are connected between the LEDs 102, 104 and the drivers 106, 108. Furthermore, a processing unit 114 is operatively connected to the drivers 106, 108, such that the processing unit 114 may control the LEDs 106, 108 through said drivers 106, 108. Software-generated signals or flags (X1, X2) may define the state (on/off) of a corresponding LED: for example, software flag X1 defines the state of LED1 102 and software flag X2 defines the state of LED2 104. The drivers 106, 108 may be I/O drivers which switch to a ground potential (GND) in case the corresponding software flag defines an "on" state, which effectively turns on the corresponding LED. For example, if software flag X1 defines an "on" state, driver 106 switches to GND, and since the voltage source 116 provides a positive voltage, current flows through LED1 102. The current-limiting resistors 110, 112 limit the current flowing through the respective LEDs 102, 104, thereby preventing LED damage. A reverse implementation (not shown) is also possible. In that case, the respective drivers are configured to provide a voltage, and the resulting current, which flows through the reversed LEDs to, for instance, a ground potential terminal, is also limited by resistors.

LEDs are often used as simple optical feedback indicators in power-constrained electronic devices, such as contactless smart cards. In example implementations, as shown in FIG. 1, three connections are often necessary to control two LEDs. Furthermore, the brightness of the LEDs is controlled by current-limiting resistors that are used, among others, to avoid device defects. One drawback of the current-limiting resistors is the voltage drop that develops across them, which may result in a reduction of the brightness of the LEDs. Another drawback of said resistors is that they dissipate power. Furthermore, the current-limiting resistors may require hardware design changes in case new LED types are used. A further drawback is that assembly of the resistors may reduce the placement performance of a pick-and-place machine which may result in higher assembly cost. Another drawback is that placement of the current limiting resistors require additional printed circuit board (PCB) area.

Contactless smartcards are powered by contactless readers. The smartcard's reception coil is coupled by mutual inductance with a supplying reader coil. Asymmetric loading of said mutual inductance may cause a too high drop in the available supply voltage, which may for example cause a smartcard circuit to stop or to malfunction. In low-cost smartcard applications, that combine very low-power requirements with connection wire limitations, it may be desirable to drive two or more LEDs safely, with dynamic brightness control, with well-balanced loading, without a need for current-limiting resistors and with no more than one interface connection per LED.

Therefore, according to a first aspect of the present disclosure, an electronic device is provided which comprises a light-emitting diode arrangement and a driver arrangement operatively connected to the light-emitting diode arrangement. At least one light-emitting diode of the light-emitting diode arrangement is operatively connected between a first driver of the driver arrangement and a second driver of said driver arrangement, such that, in operation, the light-emitting diode may be energized with current flowing between the first driver and the second driver. Thus, no separate voltage source is used, and the connection to said voltage source (e.g., a $V_{DD}$ pin) may be dispensed with. Furthermore, the current may be limited relatively easy by a suitable control of the drivers, so that the current-limiting resistors may be dispensed with. Furthermore, the impedance of the drivers may limit the current, so that the current-limiting resistors are not required. In embodiments which are relatively easy to implement, the first driver may be configured to generate a voltage above a threshold voltage of the light-emitting diode. Furthermore, the second driver may be configured to provide a ground potential or a voltage substantially below a threshold voltage of the light-emitting diode.

Figure 2:
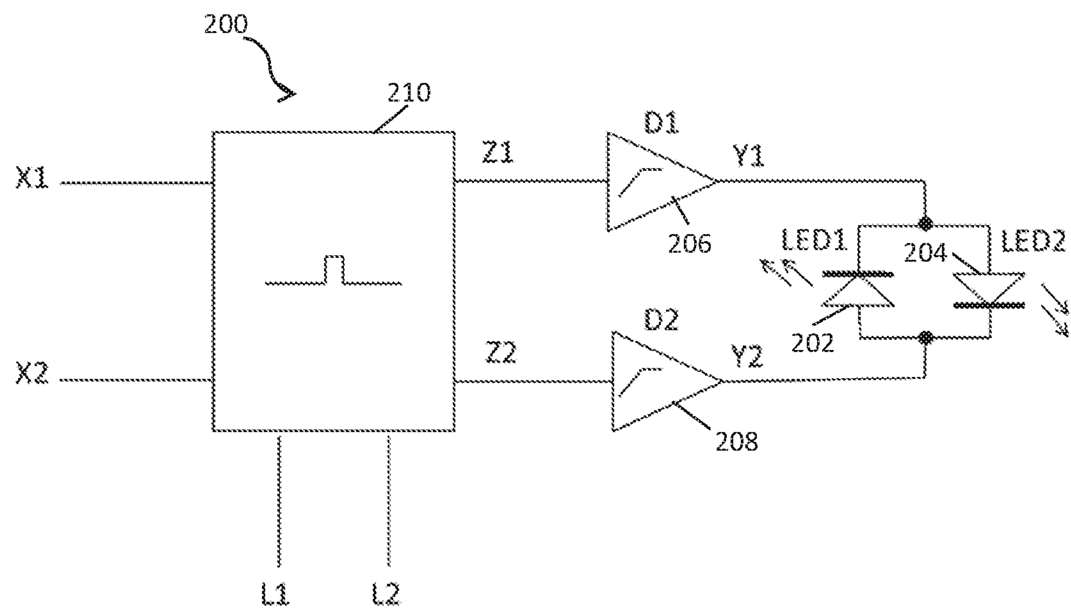
FIG. 2 shows an illustrative embodiment of an electronic device.

FIG. 2 shows an illustrative embodiment of an electronic device 200. The electronic device 200 comprises two light-emitting diodes 202, 204 and two drivers 206, 208. Furthermore, the electronic device 200 comprises a processing unit 210 operatively connected to the drivers 206, 208. Software-generated signals or flags (X1, X2) may define the state (on/off) of a corresponding LED: for example, software flag X1 defines the state of LED1 102 and software flag X2 defines the state of LED2 104. The drivers 206, 208 may be I/O drivers. In this embodiment, one of the drivers 206, 208 may provide a positive voltage while the other driver may switch to a ground potential (GND) in case a software flag defines an "on" state, which effectively turns on the corresponding LED. For example, if software flag X1 defines an "on" state, driver 206 may switch to GND and driver 208 may provide a positive voltage, so that current flows through LED1 202. Furthermore, if software flag X2 defines an "on" state, driver 208 may switch to GND and driver 206 may provide a positive voltage, so that current flows through LED2 204. In case both software flags X1 and X2 define an "on" state, the drivers may be controlled by pulsed driver signals (Z1, Z2) generated by the processing unit 210, so that the current may flow in alternating directions. Also in case only one software flag, X1 or X2, defines an "on" state, the use of pulsed driver signals may effectively provide a form of current limiting, which may reduce the risk of LED damage. Furthermore, the pulsed driver signals may be made dependent on luminance levels (L1, L2) for each LED, as will be explained with reference to FIG. 4.

As shown, in this embodiment the light-emitting diode arrangement comprises two light-emitting diodes 202, 204 which are connected in antiparallel with each other. Furthermore, the driver arrangement, which comprises two drivers 206, 208, is configured to energize the light-emitting diodes 202, 204 with current in alternating directions in dependence on the pulsed driver signals. During one pulse, driver signal Z1 may cause driver 206 to switch to GND and driver signal Z2 may cause driver 208 to provide a positive voltage, for example, thereby turning on LED1 202. This may be made dependent on software flag X1; more specifically, if software flag X1 defines an "off" state, the drivers 206, 208 may not enable the flow of current through LED1 202. During another pulse, driver signal Z2 may cause driver 208 to switch to GND and driver signal Z1 may cause driver 206 to provide a positive voltage, thereby turning on LED2 204. This may be made dependent on software flag X2; more specifically, if software flag X2 defines an "off" state, the drivers 206, 208 may not enable the flow of current through LED2 204.

Figure 3:
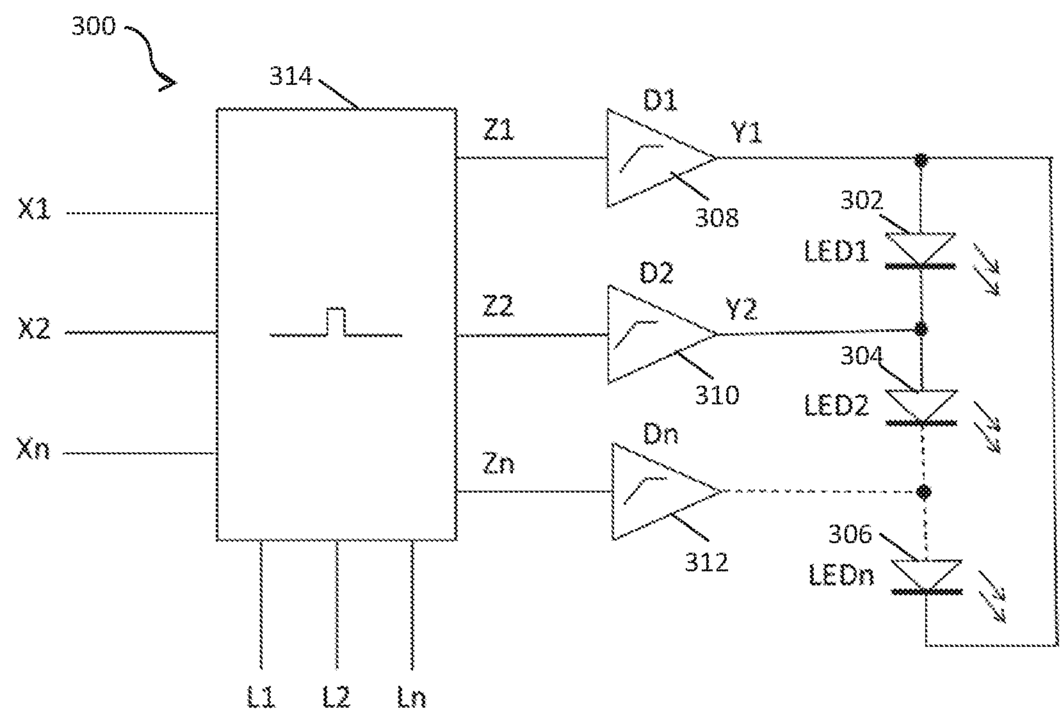
FIG. 3 shows a further illustrative embodiment of an electronic device.

FIG. 3 shows a further illustrative embodiment of an electronic device 300. The electronic device 300 comprises at least three light-emitting diodes 302, 304, 306 and at least three drivers 308, 310, 312. Furthermore, the electronic device 300 comprises a processing unit 314 operatively connected to the drivers 308, 310, 312. Software-generated signals or flags (X1, X2, X3) may define the state (on/off) of a corresponding LED: for example, software flag X1 defines the state of LED1 302, software flag X2 defines the state of LED2 304, and software flag Xn defines the state of LEDn 306. The drivers 308, 310, 312 may be I/O drivers. In this embodiment, one of the drivers 308, 310, 312 may provide a positive voltage while another driver may switch to a ground potential (GND) in case a software flag defines an "on" state, which effectively turns on the corresponding LED. For example, if software flag X1 defines an "on" state, driver 310 may switch to GND and driver 308 may provide a positive voltage, so that current flows through LED1 302. Furthermore, if software flag X2 defines an "on" state, driver 312 may switch to GND and driver 310 may provide a positive voltage, so that current flows through LED2 304.

Furthermore, if software flag Xn defines an "on" state, driver 308 may switch to GND and driver 312 may provide a positive voltage, so that current flows through LEDn 306. In case all software flags X1, X2 and X3 define an "on" state, the drivers may be controlled by pulsed driver signals (Z1, Z2, Zn) generated by the processing unit 314, so that the current may flow through one LED at a time. Also in case only one software flag, X1, X2 or X3, defines an "on" state, the use of pulsed driver signals may effectively provide a form of current limiting, which may reduce the risk of LED damage.

As shown, in this embodiment the light-emitting diode arrangement comprises a plurality of light-emitting diodes 302, 304, 306 which are connected in series. Furthermore, the driver arrangement, which comprises a plurality of drivers 308, 310, 312, is configured to energize each light-emitting diode 302, 304, 306 separately with current in dependence on the pulsed driver signals. During one pulse, driver signal Z2 may cause driver 310 to switch to GND and driver signal Z1 may cause driver 308 to provide a positive voltage, for example, thereby turning on LED1 302. This may be made dependent on software flag X1; more specifically, if software flag X1 defines an "off" state, the drivers 308, 310 may not enable the flow of current through LED1 302. During another pulse, driver signal Zn may cause driver 312 to switch to GND and driver signal Z2 may cause driver 310 to provide a positive voltage, thereby turning on LED2 304. This may be made dependent on software flag X2; more specifically, if software flag X2 defines an "off" state, the drivers 310, 312 may not enable the flow of current through LED2 304. During yet another pulse, driver signal Z1 may cause driver 308 to switch to GND and driver signal Zn may cause driver 312 to provide a positive voltage, thereby turning on LEDn 306. This may be made dependent on software flag Xn; more specifically, if software flag Xn defines an "off" state, the drivers 308, 312 may not enable the flow of current through LEDn 306.

In one or more embodiments, the driver arrangement is configured to turn on each light-emitting diode with a frequency of at least 30 Hz. In this way, the light-emitting diodes may appear to be turned on permanently to the human eye, because the single pulses are no longer visible. Thus, a constant luminance may be perceived. Furthermore, in one or more embodiments, the processing unit is configured to generate the pulsed driver signals in dependence on a predefined luminance level for the light-emitting diode. In this way, the perceived luminance may be tuned.

Figure 4:
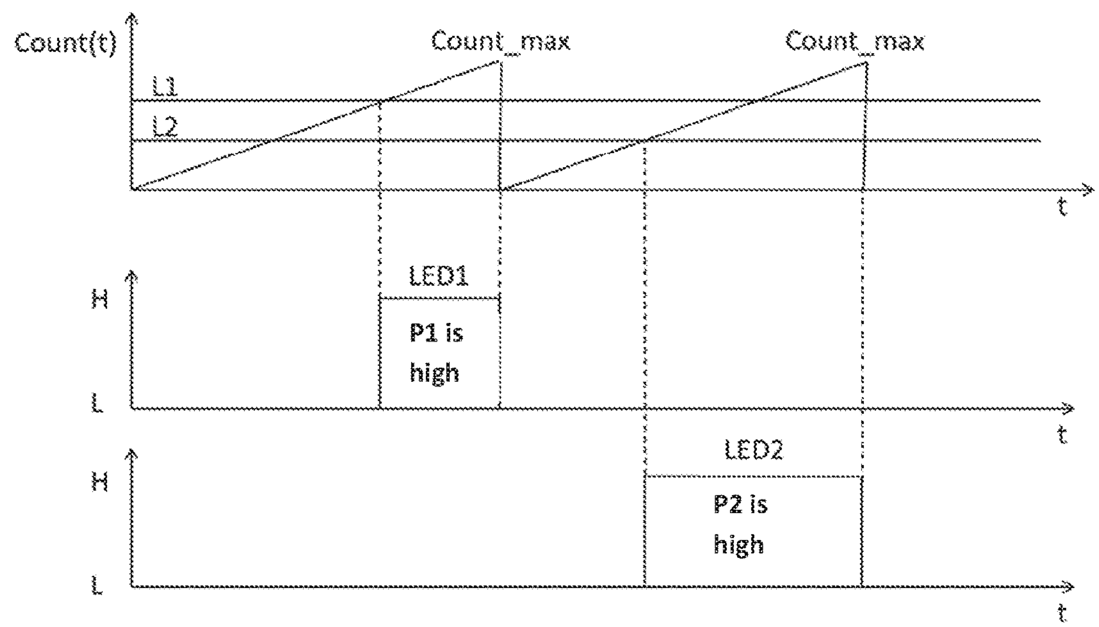
FIG. 4 shows an illustrative embodiment of generating pulsed driver signals.

FIG. 4 shows an illustrative embodiment of generating pulsed driver signals. In this embodiment, an internal counter in the processing unit is used to count up until a certain limit is reached. This event resets the counter. For each LED a luminance level L1, L2 is defined. If the counter reaches this luminance level, a corresponding pulse output signal P1, P2 goes high. The pulse output signals P1, P2 may be used for generating pulsed driver signals Z1, Z2. For example, referring back to FIG. 2, if pulse output signal P1 goes high, driver signal Z1 may be generated, which causes driver 206 to switch to GND, and driver signal Z2 may be generated, which causes driver 208 to provide a positive voltage. Furthermore, if pulse output signal P2 goes high, driver signal Z2 be generated, which causes driver 208 to switch to GND, and driver signal Z1 may be generated, which causes driver 206 to provide a positive voltage. The output is reset if the counter reaches its maximum value. There is only one counter used for all LEDs. The processing unit switches the addressed LED after every counter reset event, for example using a round-robin algorithm. This may ensure that all LED pulses have a fixed relation to each other.

Figure 5:
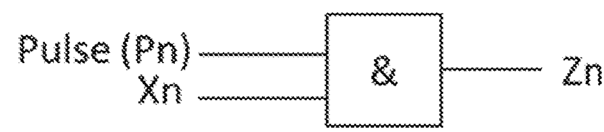
FIG. 5 shows an illustrative embodiment of generating a specific pulsed driver signal.

FIG. 5 shows an illustrative embodiment of generating a specific pulsed driver signal. In particular, a given pulse output signal Pn is combined in an AND function with a software flag Xn in order to generate a driver signal Zn. The driver signal Zn will only be generated if the software flag Xn defines an "on" state, so that the corresponding input signal Xn is high as well. The skilled person will appreciate that, since in the above-described embodiments a pair of drivers is controlled during a given pulse, a single pulse output signal may be used to generate a pair of driver signals, and consequently the AND function may further result in a driver signal Zn+1 (not shown).

Figure 6:
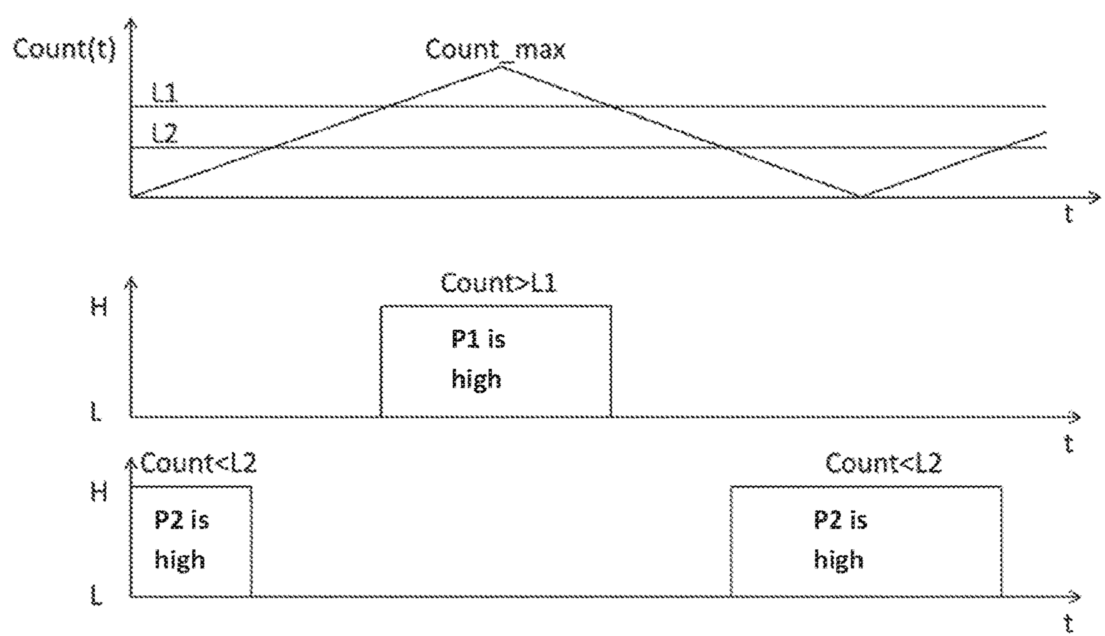
FIG. 6 shows a further illustrative embodiment of generating pulsed driver signals.

FIG. 6 shows a further illustrative embodiment of generating pulsed driver signals. In this example the counter is not reset after it reaches its maximum/minimum value, but the counting direction is reversed. A pulse output signal P1, P2 goes high if the counter passes the corresponding luminance level L1, L2 in one direction and it goes low if this luminance level L1, L2 is crossed in the opposite direction. This may result in a better distribution of the energy consumption.

Figure 7:
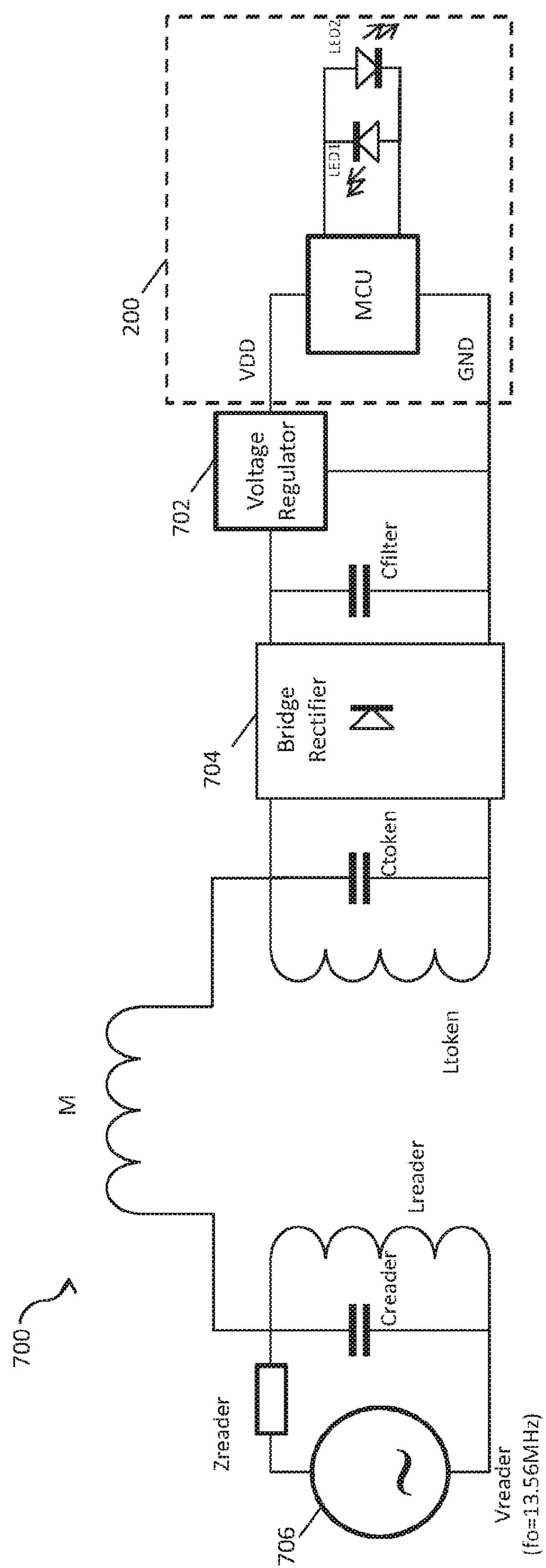
FIG. 7 shows an illustrative embodiment of a reader-token system in which an electronic device of the kind set forth may be used.

FIG. 7 shows an illustrative embodiment of a reader-token system in which an electronic device of the kind set forth may be used. The token may be a contactless smart card, for example, which may communicate wirelessly with a reader device via inductive coupling. The reader may comprise an AC voltage source 706. The token may be powered by the reader when it is in proximity of the latter. The token may comprise a bridge rectifier 704 and a voltage regulator 702. The voltage regulator 702 may limit the voltage provided to the processing unit that generates the pulsed driver signals for controlling the driver arrangement. The voltage regulator 702 is an example of a voltage limiter; it is noted that any other kind of voltage limiter may also be used. In this example, the processing unit is a microcontroller (MCU). Thus, in this embodiment, the driver arrangement is coupled, through the microcontroller, to a voltage limiter. The voltage limiter may, in synergistic cooperation with the above-described pulsed driving mode, enable an implementation in which the risk of LED damage due to peak currents is minimized. In particular, the voltage limiter may avoid LED voltages that may result in reverse breakdown of the LEDs; approaching voltages close to the reverse breakdown voltage will result in a significant current increase which may in turn damage the LEDs. The skilled person will appreciate that the total impedance of the system, which comprises the impedance of the driving AC voltage source 706, plus the impedance of the mutual inductance (M) between the coil of the reader (Lreader) and the coil of the token (Ltoken), plus the impedance of the drivers may provide a significant current limitation. The relatively large junction capacitance of the LEDs may also result in a current limitation of the junction current (low-pass behavior).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 electronic device
102 light-emitting diode
104 light-emitting diode
106 driver
108 driver
110 resistor
112 resistor
114 processing unit
116 voltage source
200 electronic device
202 light-emitting diode
204 light-emitting diode
206 driver
208 driver
210 processing unit
300 electronic device
302 light-emitting diode
304 light-emitting diode
306 light-emitting diode
308 driver
310 driver
312 driver
314 processing unit
700 reader-token system
702 voltage regulator
704 bridge rectifier
706 AC voltage source

The invention claimed is:

1. An electronic device comprising a light-emitting diode arrangement having at least two light-emitting diodes and a driver arrangement operatively connected to the light-emitting diode arrangement, wherein the at least two light-emitting diodes of the light-emitting diode arrangement are operatively connected between a first driver of the driver arrangement as a first voltage source and a second driver of said driver arrangement as a second voltage source without a separate voltage source, such that, in operation, at least one of the two light-emitting diodes is energized with current flowing between the first driver and the second driver; and further comprising a processing unit that is directly connected to the first driver and to the second driver and which is configured to generate pulsed driver signals and to control the driver arrangement by supplying said pulsed driver signals to the driver arrangement, wherein the processing unit comprises only a single counter to control the timing of the pulsed driver signals.

2. An electronic device as claimed in claim 1, wherein the first driver is configured to generate a voltage above a threshold voltage of the light-emitting diode.

3. An electronic device as claimed in claim 1, wherein the second driver is configured to provide a ground potential or a voltage substantially below a threshold voltage of the light-emitting diode.

4. An electronic device as claimed in claim 1, wherein the two light-emitting diodes are connected in antiparallel with each other, and wherein the driver arrangement is configured to energize the two light-emitting diodes with current in alternating directions in dependence on the pulsed driver signals.

5. An electronic device as claimed in claim 1, wherein the processing unit is configured to generate the pulsed driver signals in dependence on a predefined luminance level for the light-emitting diode.

6. An electronic device as claimed in any claim 1, wherein the driver arrangement is coupled to a voltage limiter.

7. An electronic device as claimed in claim 1, wherein the driver arrangement is configured to turn on the light-emitting diode with a frequency of at least 30 Hz.

8. An electronic device as claimed in claim 1, wherein the electronic device is a low-power device.

9. An electronic device as claimed in claim 1, wherein the electronic device is a smart card.

10. An electronic device as claimed in claim 1, wherein the electronic device is a contactless smart card.

11. The electronic device of claim 1 wherein the light-emitting diode arrangement comprises a plurality of light-emitting diodes which are connected in series, and wherein the driver arrangement is configured to energize each light-emitting diode separately with current in dependence on the pulsed driver signals.

12. A method of manufacturing an electronic device, comprising providing the electronic device with a light-emitting diode arrangement having at least two light-emitting diodes and a driver arrangement operatively connected to the light-emitting diode arrangement, and connecting the at least two light-emitting diodes of the light-emitting diode arrangement between a first driver of the driver arrangement as a first voltage source and a second driver of said driver arrangement as a second voltage source without a separate voltage source, such that, in operation, at least one of the two light-emitting diodes is energized with current flowing between the first driver and the second driver; and further comprising connecting a processing unit directly to the first driver and to the second driver such that pulsed driver signals generated from the processing unit control the driver arrangement, wherein the processing unit comprises only a single counter to control the timing of the pulsed driver signals.

13. The method of claim 12 wherein the light-emitting diode arrangement comprises a plurality of light-emitting diodes which are connected in series, and wherein the driver arrangement is configured to energize each light-emitting diode separately with current in dependence on the pulsed driver signals.

14. A contactless smart card that is powered by a contactless reader, the contactless smart card comprising:

an inductive coil;

a bridge rectifier connected to the inductive coil;

a microcontroller connected to the bridge rectifier;

a voltage regulator connected between the bridge rectifier and the microcontroller, wherein the inductive coil, the bridge rectifier, and the voltage regulator are the exclusive voltage source for the microcontroller;

a light-emitting diode arrangement having at least two light-emitting diodes; and a driver arrangement operatively connected to the light-emitting diode arrangement, wherein the at least two light-emitting diodes of the light-emitting diode arrangement are connected between a first driver of the driver arrangement as a first voltage source and a second driver of said driver arrangement as a second voltage source, such that, in operation, at least one of the two light-emitting diodes is energized with current flowing between the first driver and the second driver, wherein the first driver and the second driver are connected directly to the microcontroller and the light-emitting diode arrangement has no other connection to a voltage source;

wherein the microcontroller is configured to generate pulsed driver signals and to control the driver arrangement by supplying said pulsed driver signals to the driver arrangement.

15. The contactless smart card of claim 14, wherein the two light-emitting diodes are connected in antiparallel with each other, and wherein the driver arrangement is configured to energize the two light-emitting diodes with current in alternating directions in dependence on the pulsed driver signals.

16. The contactless smartcard of claim 14, wherein the microcontroller is configured to generate the pulsed driver signals in dependence on a predefined luminance level for the light-emitting diode.

17. The contactless smartcard of claim 14, wherein the microcontroller comprises only a single counter to control the timing of the pulsed driver signals.

* * * * *